United States Patent
Evans

(10) Patent No.: US 6,708,168 B2
(45) Date of Patent: Mar. 16, 2004

(54) METHOD AND APPARATUS FOR SEARCHING A DATA STREAM FOR CHARACTER PATTERNS

(75) Inventor: David J. Evans, Ottawa (CA)

(73) Assignee: Nortel Networks Limited (CA)

(*) Notice: Subject to any disclaimer, the term of this patent is extended or adjusted under 35 U.S.C. 154(b) by 318 days.

(21) Appl. No.: 09/835,978

(22) Filed: Apr. 16, 2001

(65) Prior Publication Data

US 2002/0087537 A1 Jul. 4, 2002

Related U.S. Application Data

(63) Continuation-in-part of application No. 09/750,657, filed on Dec. 29, 2000, now abandoned.

(51) Int. Cl.$^7$ .............................................. G06F 17/30
(52) U.S. Cl. .................................................. 707/6
(58) Field of Search .......................................... 707/6

(56) References Cited

U.S. PATENT DOCUMENTS

| | | | |
|---|---|---|---|
| 4,760,523 A | * | 7/1988 | Yu et al. ........................ 707/7 |
| 5,051,947 A | * | 9/1991 | Messenger et al. ............ 707/3 |
| 5,276,868 A | * | 1/1994 | Poole ............................ 707/3 |
| 5,379,420 A | * | 1/1995 | Ullner ........................... 707/6 |
| 5,497,488 A | * | 3/1996 | Akizawa et al. ............... 707/6 |
| 5,777,608 A | * | 7/1998 | Lipovski et al. ............ 345/519 |
| 5,781,772 A | * | 7/1998 | Wilkinson et al. ............ 707/3 |

\* cited by examiner

*Primary Examiner*—Wayne Amsbury
(74) *Attorney, Agent, or Firm*—Steubing McGuinness & Manaras LLP

(57) ABSTRACT

Methods and apparatus for parallel searching through a data stream. Using a register bank and comparators, the device performs a brute force search through a data stream to quickly find one or more patterns therein. The invention sacrifices physical space for speed by using multiple comparators on the same register bank. The output of the comparators is fed into a decoding circuit which determines the locations of matches and mismatches. Matches are compared against a database/table to determine their significance.

19 Claims, 3 Drawing Sheets

METHOD AND APPARATUS FOR SEARCHING A DATA STREAM FOR CHARACTER PATTERNS

CROSS-REFERENCE TO RELATED APPLICATION

The present application is a continuation-in-part of U.S. patent application Ser. No. 09/750,657 filed Dec. 29, 2000, now abandoned.

FIELD OF THE INVENTION

The invention relates generally to the field of content switching, and, more specifically, to the use of hardware to implement a parallel search through a data stream.

BACKGROUND

Conventional content switches search through packets of data to identify the nature of the traffic so that they make an intelligent switching decision based on the traffic content. These switches employ software that performs a serial search through the packets to determine data patterns. The fact that the search is serial in nature means that it starts with the first portion of the data, determines if the desired pattern is present then moves on to the next portion of the data. While this may provide acceptable performance when searching through short data packets, it is generally a relatively slow method that does not scale well when the search space becomes larger.

It would thus be beneficial to have a method of searching for data patterns in a quick and efficient manner which scales well for larger search spaces.

SUMMARY OF THE INVENTION

The present invention provides methods and apparatus for finding data patterns in a data stream.

An aspect of the invention provides a method that includes copying a portion of a data stream into a register bank to form a search space. Then the method includes comparing a data pattern to the data stream, using a multiple comparators. The comparisons are simultaneously performed by comparing the data pattern to different portions of the search space.

Another aspect of the invention provides an apparatus. The apparatus includes a register bank configured to temporarily store a portion of a data stream. The apparatus also includes multiple comparators, each linked to a register in the register bank. At least one of the comparators is configured to compare a data pattern to a portion of the data stream stored in the register bank. At least one other comparator is configured to compare the data pattern to another portion of the data stream stored in said register bank. Both comparators are configured to operate simultaneously.

Yet another aspect of the invention provides an apparatus that includes a register module for storing portions of a data stream. The apparatus also includes a comparing module for simultaneously comparing a character pattern to different portions of the stored data stream.

An aspect of the invention provides an apparatus that includes a register bank, having different portions, that is configured to store a portion of a data stream. The apparatus also includes multiple comparators, each having an output and each linked to a different portion of the register bank. One of the comparators is configured to compare a data pattern to a portion of the stored data stream. Another comparator is configured to simultaneously compare the data pattern to another portion of the stored data stream. The apparatus includes an encoder circuit that receives the output from the comparators. The encoder circuit is configured to determine if a comparison made by one or more of the comparators results in a match.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

Figure 1:
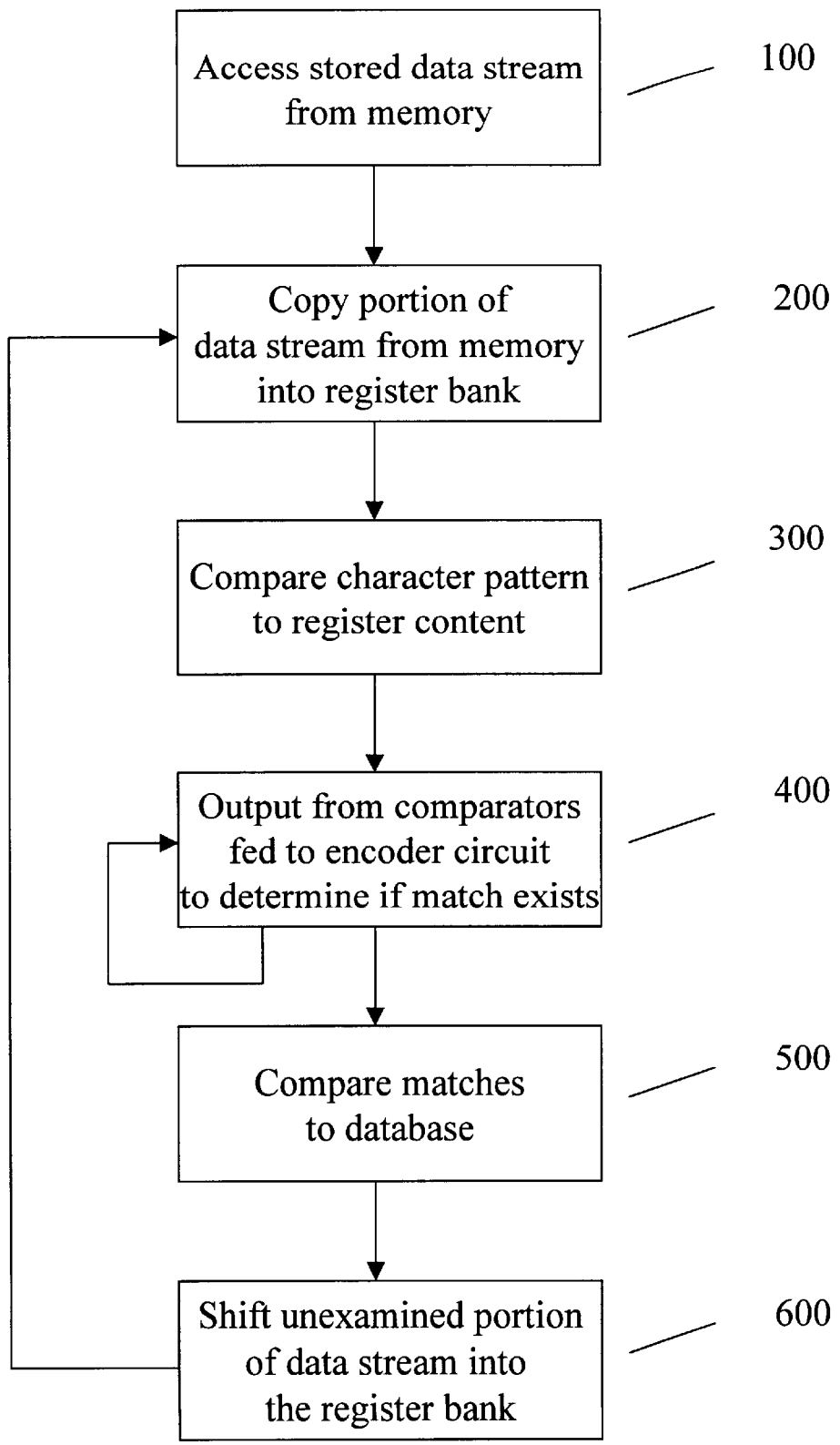
FIG. 1 depicts a flow chart of an embodiment of the invention.

The invention provides methods (FIG. 1) and apparatus (FIG. 2) for parallel searching through a data stream. Using register banks 20 (having 1 or more registers per register bank) and comparators 30 (e.g. AND gates or some other logic devices which perform comparisons and which may be reconfigurable), the device performs a brute force search through a data stream 10 to quickly find one or more patterns therein. The invention sacrifices physical space for speed by using multiple comparators 30 on the same register bank 20. Although as components get smaller, the physical space needed may decrease.

Figure 2:
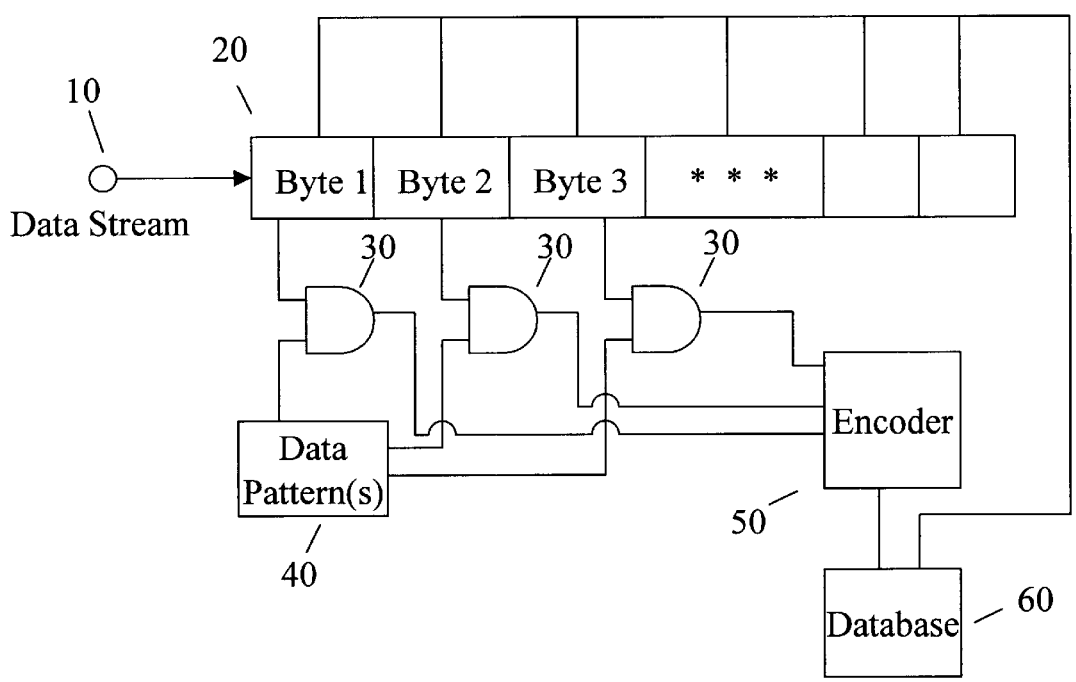
FIG. 2 depicts a block diagram of an embodiment of the invention.
Figure 3:
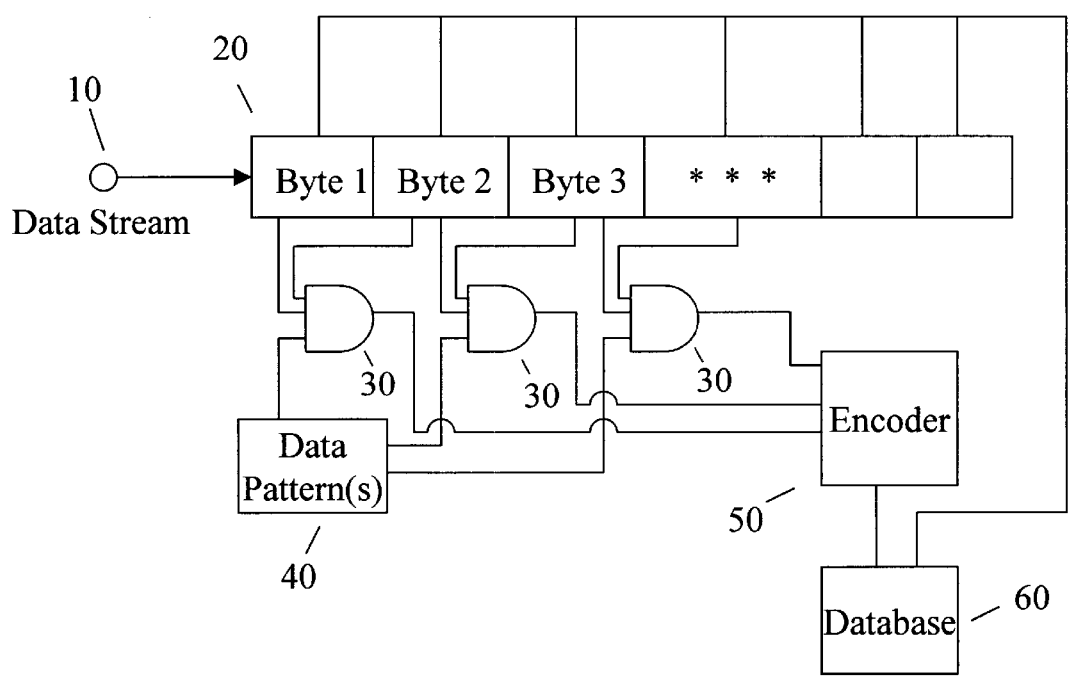
FIG. 3 depicts a block diagram of an alternate embodiment of the invention.

FIG. 1 provides a flowchart of an embodiment of the invention. As illustrated in Step 100, a data stream 10, which may contain one or more character patterns (e.g. words, letter, numbers, etc.), is stored in a physical memory or some other medium with limited access. For purposes of illustration, it will be assumed that there is a character pattern that is 1 byte long and a data stream that is 512 bytes long. Those skilled in the art will recognize that the preceding numbers are illustrative rather than limiting in that the character pattern(s) may be smaller or larger than 1 byte and the data stream may be smaller or larger than 512 bytes.

In operation, a portion of the data stream 10 is copied into a register bank 20 as illustrated in Step 200. This portion will be referred to as the "search space". The size of the search space may be configured by the user or it may be set by default to a particular size. It is also limited by the size of the register bank 20 used. For example, if an 8 byte register bank 20 is used, then the search space is limited to 8 bytes. In a preferred embodiment, the search space will be 256 bytes, which is the largest practical register bank 20 currently available. However, as technology improves, it may become practical to implement larger register banks 20 and thus to increase the size of the search space. In a preferred embodiment the data stream 10 is smaller than 256 bytes. Thus, the entire data stream 10 may be copied into the register bank 20 so that the search space is effectively the entire data stream 10. By storing a portion of the data stream 10 in a register bank 20, every byte of the search space may be simultaneously accessible.

As illustrated in Step 300, the character pattern 40 sought is replicated by logic and simultaneously compared to different areas of the search space. This may be accomplished by using multiple comparators 30 each having one input linked to a byte from the register bank 20 and one input linked to a byte from the character pattern 40 sought. Therefore, the maximum number of comparators 30 needed is equal to the number of bytes in the register bank 20. In the present example, 256 comparators 30 would be needed. If the search pattern is less than 1 byte then the maximum number of comparitors 30 will increase. For example, the maximum number of compators 30 for a search pattern that is 4 bits long (½ of 1 byte) will be twice that of the previous example (or 512). While the maximum number of comparators 30 may be preferable to maximize speed, there can be as few as 2 comparators 30 employed. In such a configuration, the comparators 30 would each simultaneously check 1 location in the data stream 10, then they would each check another location, etc. In essence the parallel search would become a partial parallel search and partial serial search. However, it would still be faster than a completely serial search.

The output of each of the comparators 30 is linked to an encoder circuit 50 (Step 400). Encoder circuits 50 are well known and thus will not be discussed further herein. The encoder circuit 50 determines the location of the first match and the location of the first mismatch following the match. The encoder circuit 50 may determine the location of the first match by prioritizing the results from all of the comparators and selecting the results with the highest priority as the first match (although there may be some reason to select a match that is not the highest priority as the first match). It may be possible to have many sequential matches between the first match and the first mismatch. If this is the case, the encoder circuit 50 may block out an entire sub-portion of the search space, since every byte in that sub-portion matches a character pattern 40 (in this case, the comparison would be for a set or range instead of for an exact match). This sub-portion may be a word or token (a grouping of matched patterns). Once the first match is found, the encoder circuit 50 may stop determining the presence of matches. Alternatively, the process may continue until all matches within a certain search space have been determined and the corresponding sub-portions have been blocked out or until a predetermined number of matches are found.

There need not be a one-to-one relationship between the character pattern sought and the match. For example, if the character pattern sought is "ASCII a" then only an ASCII "a" will result in a match. However, the comparator 30 could be configured to look for patterns in a range (e.g. "ASCII a–z", "ASCII A–Z", etc.) or in a set (e.g. "<tab>, and/or <space>, etc."), or the pattern could include one or more mask patterns (do not care/joker/wildcard patterns). If the pattern falls within the range or is one of the values in the set or includes everything in the pattern plus something that would fall within the mask pattern, then a match is found.

Matches resulting from the search, may be compared to a database 60 (Step 500) to determine if the group of relatively simple patterns that were found (e.g. the word or token) represent more complex patterns. This may be performed using a hashing function lookup or a content addressable memory ("CAM"), etc. (All well known and thus not discussed herein). The lookup may be performed after the determination of the first grouping, after the encoder 50 determines the location of all of the groupings, or after a predetermined number of groupings are determined. Since the encoder 50 receives all of the grouping information in parallel, it may be preferable to determine each location before performing the lookup.

If there are no matches in the search space and there remains an unexamined portion of the data stream 10, the register bank 20 is cleared and replaced by the unexamined portion of the data stream 10, as illustrated in Step 600. The register bank 20 may be cleared by sequentially shifting some or all of the data out of the register bank 20 and replacing the shifted data with the new data (e.g. a shift register) or it may be replaced by a parallel replacement of some or all of the elements of the data stream 10. These changes to the register bank 20 could be controlled by a processor such as an ASIC (application specific integrated circuit), a microprocessor, a clock, etc. The content of the register bank 20 may also be changed to the unexamined portion even if the there is a match in the search space if the system is configured to search the entire data stream 10. For example, if no matches were found in the first 256 bytes of the data stream, the first 256 bytes would be dumped from the register bank 20 and the second 256 bytes would be stored in the register bank 20. The search process would be repeated to see if the character pattern was present in the second set of 256 bytes.

The process may stop when any of the following occurs: (a) a first match is found and compared to a database; (b) a certain number of matches are found and compared to a database; (c) a certain search space is searched, matches are found and compared to a database; (d) the entire data stream is searched, matches are found, and compared to a database; or (e) the entire data stream is searched and no matches are found.

As noted previously, the character pattern 40 may be more than 1 byte in length. For example, it may be 4 bytes in length or some other length. For relatively small patterns the present invention may examine the search space for the presence of these character patterns in a random order or in the sequentially correct order (e.g. Bytes 0, 1, 2, 3 or Bytes 1, 2, 3, 0) without sacrificing significant speed. An advantage of this type of configuration is that Step 500, where the match is compared to a database, table or spreadsheet (referred to as a database), may be skipped. For example, complex search patterns found as a result of groups of individual matches of simpler patterns are compared to the database 60 to determine their true meaning. However, if the comparator 30 was searching for a simple word like the word "the" it may not have to perform the lookup in the database 60.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

The following claims are intended to cover all of the generic and specific features of the invention described herein, and all statements of the scope of the invention which, as a matter of language, might be said to fall there between.

Having described the invention, what is claimed is:

1. A method for searching a data stream for a data pattern comprising:

copying a portion of the data stream into a register bank to form a search space; and comparing copy of said data pattern to the search space using a plurality of comparators, by simultaneously and completely comparing said copy of said data pattern to different portions of said search space, such that each of said different portions of said search space are simultaneously compared with all of said copy of said data pattern concurrently during a single period of time.

2. The method according to claim 1 wherein said data pattern has a length of 1 byte.

3. The method according to claim 1 wherein said data pattern includes a set of data patterns.

4. The method according to claim 1 wherein said data pattern is a range of data patterns.

5. The method according to claim 1 wherein said data pattern includes a mask pattern.

6. The method according to claim 1 further comprising:
comparing a set of matches between said first match and said first mismatch to a list of data patterns stored in a database.

7. The method according to claim 1 further comprising:
encoding a result of said comparing to determine all matches and mismatches in said search space.

8. The method according to claim 1 further comprising:
removing said portion of said data stream from said register bank and replacing said portion with another portion of said data stream to form another search space; and
comparing said data pattern to said data stream, using said plurality of comparators, by simultaneously comparing said data pattern to different portions of said another search space.

9. The method of claim 1, further comprising encoding results of said comparing with respect to each of said different portions of said search space to provide encoded results, wherein said encoded results indicate a location within said search space of a first one of said different portions completely matching said copy of said data pattern, and wherein said encoded results further indicate a location of a second one of said different portions, said second one of said different portions following said first one of said different portions, wherein said second one of said different portions does not completely match said copy of said data pattern.

10. Apparatus for searching a data stream for a data pattern comprising:
a register bank configured to temporarily store a portion of a data stream; and
a plurality of comparators, each coupled to said register bank; and
wherein each of said plurality of comparators is configured to completely compare a copy of the data pattern to a respective one of a plurality of different portions of said data stream stored in said register bank, such that each of said different portions of said search space are simultaneously compared with all of said copy of said data pattern concurrently during a single period of time.

11. The apparatus according to claim 10 wherein at least one of said plurality of comparators is reconfigurable.

12. The apparatus according to claim 10 wherein:
each of said comparators includes at least an output; and,
said apparatus further includes an encoding circuit;
wherein the outputs from at least two of said plurality of comparators are coupled to said encoding circuit.

13. The apparatus according to claim 12 wherein the outputs from each of said plurality of comparators are coupled to said encoding circuit.

14. The apparatus according to claim 13 further comprising:
a database of patterns;
wherein if said encoder determines that a comparison resulted in a match, said match is compared to said patterns in said database.

15. The apparatus according to claim 12 further comprising a processor in electrical communication with said register bank;
wherein said processor is configured to empty at least a portion of said register bank and provide another portion of said data stream into said register bank.

16. Apparatus for searching for a character pattern within a data stream comprising:
register means for storing a portion of said data stream to form a search space; and
comparing means for simultaneously and completely comparing a copy of said character pattern to different portions of a data stream stored in said register means, such that each of said different portions of said search space are simultaneously compared with all of said copy of said data pattern concurrently during a single period of time.

17. Apparatus for searching a data stream for a data pattern comprising:
a register bank, having a plurality of registers, configured to store a portion of said data stream as a search space; and,
a plurality of comparators, each having an output and each coupled to a different register of said register bank;
wherein each of said plurality of comparators is configured to simultaneously compare a copy of said data pattern to a respective one of a plurality of portion of said data stream stored in said register bank; and,
an encoder circuit coupled to said outputs of each of said plurality of comparators;
wherein said encoder circuit is configured to determine if a comparisons result in a match.

18. The apparatus according to claim 17 further comprising:
a database of patterns;
wherein if said encoder determines that a comparison resulted in a match, said match is compared to said patterns in said database.

19. The apparatus according to claim 18 further comprising a processor in electrical communication with said register bank;
wherein said processor is configured to empty at least a portion of said register bank and provide another portion of said data stream into said register bank.

* * * * *